July 8, 1958  G. L. BRADFIELD  2,842,096
PORTABLE SELECTIVE TYPE HOPPER AND TROUGH FEEDER
Filed Aug. 23, 1955  4 Sheets-Sheet 1
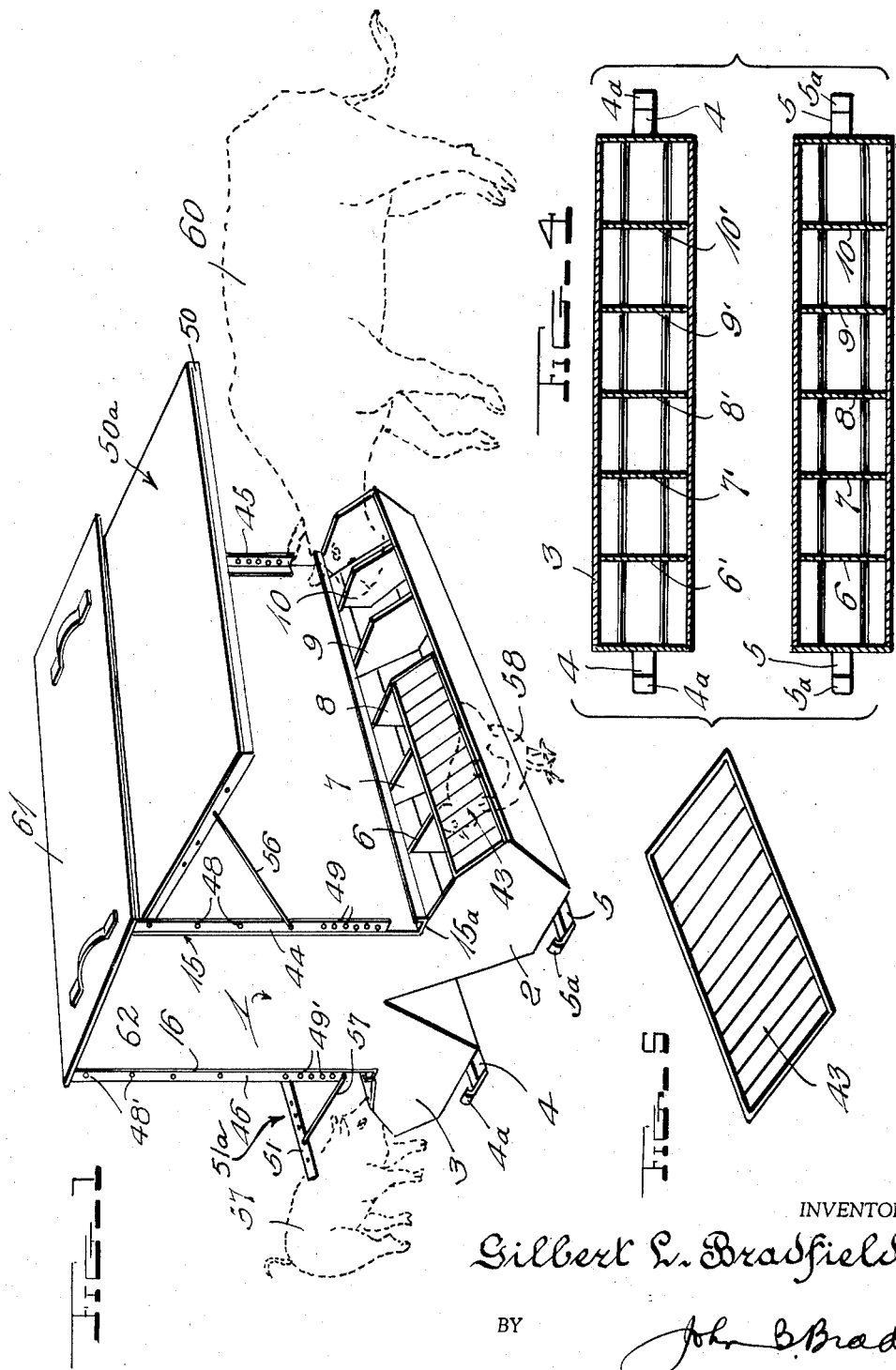
INVENTOR
Gilbert L. Bradfield,
BY
John B. Brady
ATTORNEY July 8, 1958     G. L. BRADFIELD     2,842,096
PORTABLE SELECTIVE TYPE HOPPER AND TROUGH FEEDER
Filed Aug. 23, 1955     4 Sheets-Sheet 2
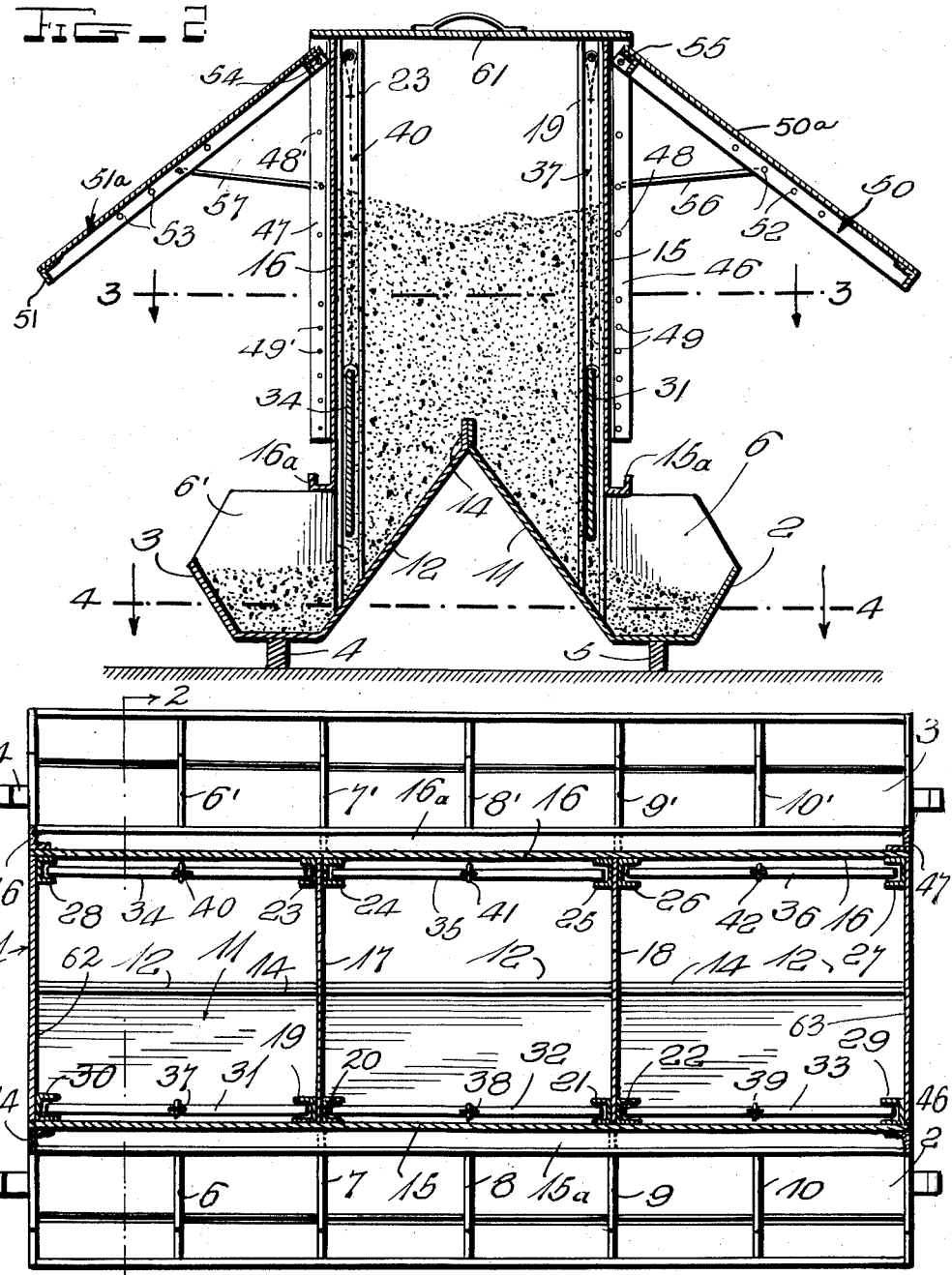
INVENTOR
Gilbert L. Bradfield,
BY
John B. Brady
ATTORNEY July 8, 1958 — G. L. BRADFIELD — 2,842,096
PORTABLE SELECTIVE TYPE HOPPER AND TROUGH FEEDER
Filed Aug. 23, 1955 — 4 Sheets-Sheet 3
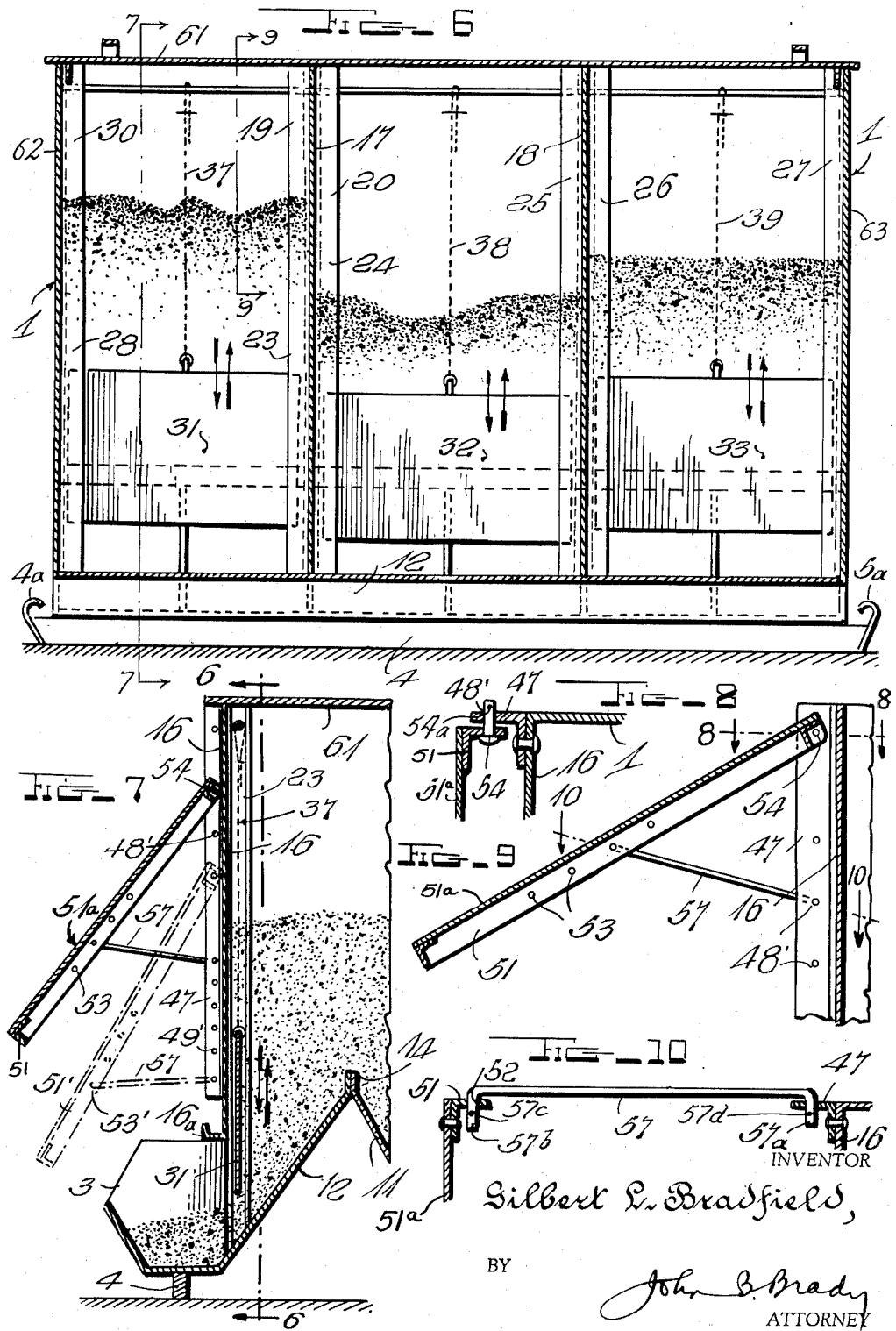
INVENTOR
Gilbert L. Bradfield,
BY John B. Brady
ATTORNEY July 8, 1958 G. L. BRADFIELD 2,842,096
PORTABLE SELECTIVE TYPE HOPPER AND TROUGH FEEDER
Filed Aug. 23, 1955 4 Sheets-Sheet 4
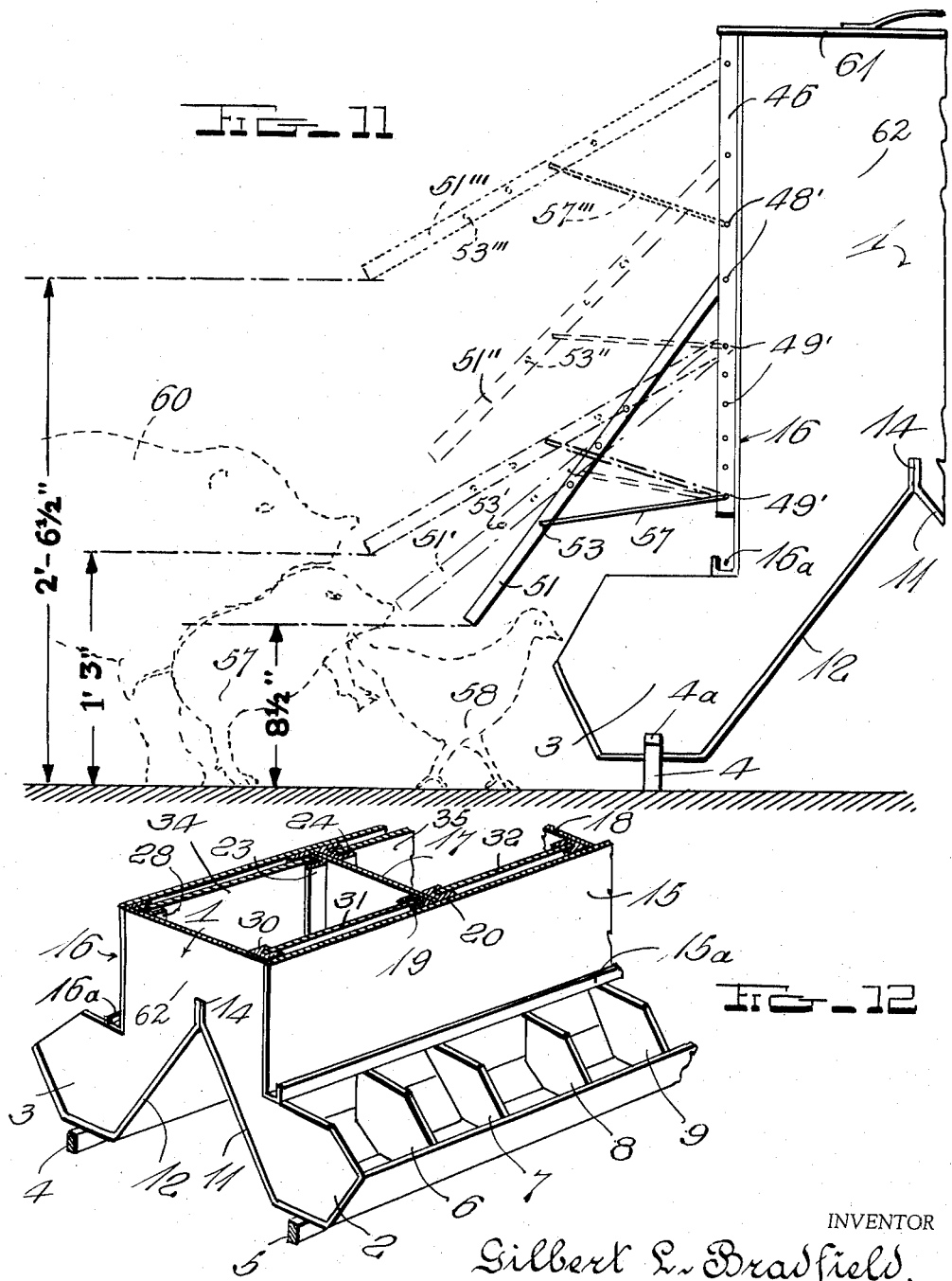
INVENTOR
Gilbert L. Bradfield,
BY
John B. Brady
ATTORNEY United States Patent Office 2,842,096
Patented July 8, 1958

2,842,096

PORTABLE SELECTIVE TYPE HOPPER AND TROUGH FEEDER

Gilbert L. Bradfield, Chandler, Ind.

Application August 23, 1955, Serial No. 530,035

2 Claims. (Cl. 119—52)

My invention relates broadly to animal husbandry and more particularly to a construction of feeder universally adaptable for the feeding of a variety of animals and fowl.

One of the objects of my invention is to provide a construction of feeder including a multiplicity of feed troughs having means for regulating the variable space for access to the feed troughs and correspondingly controlling the adaptability of the feeder for certain types of animals or fowl.

Another object of my invention is to provide a construction of universal feeder for animals and fowl which includes guard frames mounted over feed troughs and which serve to so restrict the head-room over the feed troughs that certain types of animals or fowl are excluded from access to the feed troughs, while other species of animals or fowl may readily feed from the troughs beneath the guard frames.

Still another object of my invention is to provide a construction of feed hopper and associated feed troughs partitioned into sections from which various species of animals and fowl may feed and including vertically disposed frame members extending above the openings in the feed troughs and operative to receive adjustable guard frames therein which may be selectively positioned at various angles above the openings in the feed troughs for restricting the entry space above the openings and also serving as a shelter extending over the feed troughs.

Still another object of my invention is to provide a structural arrangement of universal feeder in which feed is gravitated from a main hopper to a multiplicity of side troughs with frame members extending above the troughs and provided with groups of spaced perforations, one group of the perforations serving to receive pivot means for pivotally mounting a guard frame over the openings in the trough and the other group of perforations being arranged to receive the insertable ends of brace members the opposite ends of which are engageable in any one of a selected set of perforations arranged in opposite ends of the guard frame whereby the guard frame may be adjustably supported over the trough openings in various selected angular positions for both sheltering the troughs and restricting the entry space above the troughs.

Other and further objects of my invention reside in the structural arrangement of guard frame and hopper assembly by which the guard frame may be adjustably supported in various angular positions with respect to the hopper and feed troughs associated therewith as set forth more fully in the specification hereinafter following by reference to the accompanying drawings, in which:

Fig. 1 is a perspective view of the universal feeder of my invention showing the guard frame at one side of the main hopper raised to its maximum elevated position, whereby the feed troughs connected with the feed hopper are accessible to animals or stock of maximum size such as cattle, horses, or zoological animals, while the guard frame at the opposite side of the feed hopper is positioned to exclude the larger animals and permit access to the feed troughs of simply smaller animals or fowl.

Fig. 2 is an enlarged vertical transverse sectional view taken substantially on line 2—2 of Fig. 3 through the universal feeder of my invention and illustrating the guard frames at opposite sides of the feeder adjusted to symmetrical elevated positions above the feed troughs;

Fig. 3 is an enlarged horizontal sectional view taken substantially on line 3—3 of Fig. 2;

Fig. 4 is an enlarged horizontal sectional view taken substantially on line 4—4 of Fig. 2;

Fig. 5 is an enlarged perspective view of one section of grate which may be supplied for covering the opening in the feed troughs for restricting access of the exposed feed to fowl and the like;

Fig. 6 is an enlarged longitudinal sectional view through the main hopper taken substantially on line 6—6 of Fig. 7;

Fig. 7 is a fragmentary transverse vertical sectional view taken substantially on line 7—7 of Fig. 6 through the hopper and the associated trough at one side of the hopper and illustrating particularly the manner of adjusting the guard frame over the opening in the trough;

Fig. 8 is an enlarged fragmentary transverse sectional view illustrating the manner in which the guard frame is pivotally mounted in the frame member above the trough, the view being taken on line 8—8 of Fig. 9;

Fig. 9 is an enlarged fragmentary transverse sectional view taken substantially on line 9—9 of Fig. 6 through one of the guard frames and showing one of the associated vertically disposed frame members and illustrating one of the brace members placed in position for maintaining the guard frame at a predetermined angular position with respect to the side wall of the hopper;

Fig. 10 is enlarged sectional view taken substantially on line 10—10 of Fig. 9, this view being shown on an enlarged scale;

Fig. 11 is an enlarged fragmentary end elevational view of the main hopper and the associated side trough in the feeder of my invention and showing particularly the manner in which the guard frame may be adjusted to restrict the entry space over the feed trough for correspondingly excluding entry of various types of animals; and Fig. 12 is a fragmentary perspective view showing more clearly the structure of the feeder by which certain feed troughs may be selectively cut off from the feed bins of the hopper for the supplying of pre-arranged types of feed for selected types of animals or fowl.

My invention is directed to a construction of feeder which is capable of universal application for the feeding of animals and fowl of different species, sizes and types in zoos or on farms where the feeder is adaptable for either group feeding of various types of animals or may be readily adjusted for the feeding of animals or fowl of certain predetermined species. I provide a main feed hopper arranged to gravitationally supply feed to troughs at opposite sides thereof. Over these troughs I arrange frame members which are provided with groups of spaced perforations. These perforations are longitudinally aligned and may be pivotally engaged by pintles located adjacent the rear edges of guard frames which are thus hingedly connected in adjustable positions with opposite sides of the main hopper. Brace members are provided for adjustably engaging selected perforations in the frame members and other spaced perforations in the ends of the guard frames whereby the guard frames are shiftable to various angular positions in the openings of the feed troughs for predetermining the head-room or entry space above the feed troughs. For example, a farmer who may have only three milk cows and four hogs, plus a few chickens, on the same feed lot, may employ the universal feeder of my invention by setting the protective canopy or guard frame high on one side of the main hopper and low on the other side of the main hopper so that fowl may feed from the troughs at one side of the hopper while the animals may feed only from the troughs at the other side of the main hopper. The animals are excluded from feeding from the troughs in the first mentioned side of the main hopper and are forced to seek food elsewhere, such as from the troughs on the opposite side of the main hopper. Cattle and other large animals are excluded from consuming the feed intended for the fowl, as only the fowl can have access to the feed troughs beneath the guard frame adjusted to a position intended only for access by the fowl. Thus in a zoo or farm where a certain species of animal must be fed the guard frames are adjusted for the feeding of those particular animals according to the average height of the animals.

Referring to the drawings in more detail, reference character 1 designates the main hopper having side hoppers 2 and 3 connected therewith and mounted on longitudinally extending skids 4 and 5 having pull hooks 4a and 5a on each end thereof. By means of these pull hooks the feeder may be readily moved from one location to another in a field or building. The side hoppers 2 and 3 are divided into troughs by partitions 6, 7, 8, 9 and 10 at one side and 6', 7', 8', 9' and 10' at the other side. The main hopper 1 is formed by means of inclined inner walls 11 and 12 which are secured along the longitudinal center of the hopper by a joint indicated at 14. The main hopper is completed by means of side walls 15 and 16 which extend vertically forming, with partitions 17 and 18, and end walls 62 and 63, bins for supplying different kinds of feed to the associated troughs. The end walls 62 and 63 may be formed integral with side walls 15 and 16 or the side walls 15 and 16 may be welded to the end walls 62 and 63 or otherwise connected through a suitable frame structure.

The side walls 15 and 16 terminate at their lower edges in rain gutters 15a and 16a above the several troughs. The bin partitions 17 and 18 extend transversely of main hopper 1 and are secured to the side walls 15 and 16. Adjacent the junctions of partitions 17 and 18 with the side walls 15 and 16 I arrange sets of channels 19, 20; 21, 22; 23, 24; and 25, 26; with their backs to the partitions within the main hopper and single channels 27, 28, 29 and 30 with their backs to the end walls of the main hopper as shown more clearly in Fig. 3. These channels serve as guide rails for the adjustable gates 31, 32, 33, 34, 35 and 36 which are raised to desired positions by means of chains 37, 38, 39, 40, 41 and 42 and suspended at the desired operating position for allowing the feed or grain to gravitate from the bins of the main hopper 1 into the individual sections of the feed troughs 2 and 3. By regulating the position of the gates 31–36, the required amount of feed of the desired kind can be supplied to the individual sections of the troughs 2 and 3.

In order to preclude access by the animals to certain of the feed troughs I provide sectionalized gratings 43, shown in Fig. 5, which extend over the inclined and horizontally extending portions of the openings of the individual sections of the feed troughs and preclude the animals from devouring the food while enabling the fowl to readily pick the feed from the troughs through the gratings.

In Fig. 1, I have simply indicated the gratings 43 extending over the inclined portions of the openings in the sections of the trough, but it will be understood that additional sections of the gratings are applied over the horizontally extending portions of the sections of the trough. The hopper is provided with vertically disposed frame members 44, 45, 46 and 47 adjacent each corner thereof, extending above the feed openings in the troughs. These frame members are each provided with groups of perforations, one group of which is indicated in Fig. 2, at 48; and the other group of which is indicated at 49. It will be noted that the perforations 48 are more widely spaced than the perforations 49 as the groups of perforations determine the positions at which the angularly adjustable guard frames 50 and 51 are supported. The guard frames 50 and 51 comprise angle members formed into rectangular frames over which the panels 50a and 51a are secured. The opposite flanges of the angle members constituting the ends of frames 50 and 51 contain sets of spaced perforations represented at 52 and 53. The rear longitudinal edges of each of the guard frames 50 and 51 are provided with longitudinally aligned pintles 54 and 55 shown more clearly in Fig. 8. These pintles are adapted to be selectively inserted in any one of the sets of perforations 48 in vertically extending frame members 44 and 45 or perforations 48' or 49' in vertically extending frame members 46 and 47. The guard frames are adapted to be maintained in selected angular positions with respect to the feed openings to the feed troughs by means of brace members represented at 56 and 57 located at each end of the guard frames and formed as shown more particularly in Fig. 10. Each brace member comprises a bar which is turned inwardly at each end thereof as represented at 57a and 57b in Fig. 10. The end 57a is selectively inserted in any one of the sets of perforations 48' or 49', while the inwardly turned end 57b is selectively inserted in any one of the perforations 53 in the end of the guard frame 51. After insertion of the pintles 54 or 55 and after insertion of the ends of the brace members 56 and 57 in selected positions, such pintles or brace members are secured in position by removable cotter pins indicated in the drawings 54a and 57c and 57d in Fig. 10. The guard frames 50 and 51 may thus be selectively positioned at any desired angle over the openings to the feed troughs as I have indicated in dotted lines in Figs. 7 and 11. For example, in Fig. 7, guard frame 51 may be selectively positioned in the full line position shown or in the dotted line position 51'. In the full line position the brace member 57 has one end inserted in the next to the last perforation 53 in the end of the guard frame 51 nearest the leading edge thereof, while the opposite end of brace member 57 is inserted in the first of the group of perforations 49'. In the dotted line position, the guard frame 51', shown in Fig. 7, is shown removed to the position 57' where one end of the brace member 57' is inserted in the last of the perforations represented at 53' in the end of guard frame 51 and in the last of the perforations 49' in vertically disposed frame member 47. Under these two conditions it will be clear that the entry space between the guard frame and the openings to the feed troughs is very restricted. In Fig. 11 this variation in entry space has been brought out in terms of average dimensions. For example, in the full line position of guard frame 51, as illustrated, the entry space over the feed opening to the trough 3 is only sufficient for the feeding of fowl, represented at 58, where the height of the limiting edge of guard frame 51 is only 8½" above the supporting surface on which the feeder is mounted. Under these conditions the rear edge of guard frame 51 is pivoted in the last of the perforations 48' in vertically disposed frame member 47, while brace member 57 is pivoted at one end in the last of the perforations 49' in vertically disposed frame member 46 and at the other end in the last of the perforations 53 in guard frame 51. When the guard frame 51 is moved to the position shown in dotted lines at 51" with the pintles at the rear of the guard frame inserted at the first of the perforations 49' in vertically disposed frame member 46, and the brace member shown at 57" extending between the last of the perforations 49' and the second of the perforations shown at 53" in the end of the guard frame, the limiting height of the guard member above the supporting surface is increased to 1'3", adequate for the entry of a small animal such as swine, represented at 59. Both of these positions exclude the taller animals, such as cattle, as represented at 60, from feeding. When, however, the guard frame is moved to the position represented at 51" with the rear edge thereof pivoted in the first of the perforations 48' in vertically disposed frame member 46 and the brace member 57" engaged in the next to the last perforations 48' and the next to the last of perforations 53"', the clearance above the feed trough averages 2'6½" which is adequate for the entry and feeding of the cattle 60. For smaller fowl it is entirely practical to protect the feed by moving the guard frame into the other dotted line positions shown either in the group of perforations 49', spaced a short distance apart, or in the more widely spaced perforations in the group of perforations 48'. I have illustrated certain of these positions in dotted lines.

The main hopper 1 is covered by a removable cover 61 which is readily removed for the filling of the bins with feed for gravitating into the several sections of the troughs 2 and 3.

In Fig. 1, I have shown the guard frame 51 so positioned that only swine and fowl may feed from the sections of the trough 3 while guard frame 50 is so adjusted that animals may feed from the sections of the trough 2.

Various combinations of settings may be effected so that the feeder may be made applicable for the feeding of only one class of animals or fowl at one side of the feeder and other classes of animals or fowl at the other side of the feeder. I make use of the physical structure of the different classes of animals which prohibits the animals from bending backwards sufficiently to gain access to the feed trough. While chickens or fowl are physically able to maneuver through restricted spaces for feeding, hogs, or swine, cattle or certain zoological animals cannot do this. Hence the restricted opening permitted over the feed troughs serves as a selective means for rendering the feeder applicable only to desired classes of animals and fowl.

It will be observed that the partitions 6, 8, 10 and 6' 8' and 10', as shown in Fig. 3, extend between the inner walls 11 and 12 and the outside walls of hoppers 2 and 3, while partitions 7 and 9 and 7' and 9' are coextensive with the partitions 17 and 18, respectively, for dividing the hopper into bins and sections. This arrangement gives proper space for the raising and lowering of the adjustable gates 31, 32, 33, 34, 35 and 36 between the end wall and partitions 7 and 7'; between partitions 7 and 7' and 9 and 9'; and between partitions 9 and 9' and the other end wall of the hopper as shown more clearly in Fig. 3.

While I have described my invention in certain preferred embodiments I realize that certain modifications may be made and I desire that it be understood that no limitations upon my invention are intended other than may be imposed by the scope of the appended claims.

What I claim as new and desire to secure by Letters Patent of the United States is as follows:

1. A universal feeder for animals comprising a vertically extending feed hopper, a feed trough connected with the bottom of said hopper for gravitationally receiving feed therefrom, vertically extending elongated frame members arranged at each end of said hopper and projecting outwardly from the plane of the side wall thereof and having sets of spaced apertures in the outwardly projecting portions of said elongated frame members disposed at varying heights above the top of said feed trough, the sets of apertures in the frame members being horizontally aligned with respect to the top of said feed trough, a substantially rectangular guard frame, a panel extending over said guard frame, the opposite ends of said guard frame having a series of spaced apertures therein, means at opposite ends of said guard frame for detachably engaging selected horizontally aligned apertures in said frame members on pivots which may be raised or lowered with respect to the open top of said feed trough in a position spaced from the side wall of said hopper and swingable on said pivots to a position wherein the panel thereof extends over the open top of said feed trough and means detachably engageable with said frame members and with selected apertures in the opposite ends of said guard frame for maintaining said guard frame in a selected inclined plane over the open top of said feed trough for restricting the headroom space over the open top of the feed trough, the pivots of said guard frame being selectively setable in horizontally aligned apertures in said frame members for selectively limiting the headroom access by animals to said feed trough.

2. A universal feeder for animals as set forth in claim 1 wherein said means detachably engageable with said frame members and with selected apertures in the opposite ends of said guard frame are brace members having inturned ends where the inturned end at one end of each brace member is insertable into selected apertures in the opposite ends of said guard frame and wherein the inturned end at the other end of said brace member is insertable into selected apertures in said elongated frame members for maintaining said guard frame and the panel which extends over said guard frame in a selected angularly disposed plane projecting over the open top of said feed trough.

References Cited in the file of this patent
UNITED STATES PATENTS

| | | |
|---|---|---|
| 1,188,274 | Holligan | June 20, 1916 |
| 1,257,638 | Robbins | Feb. 26, 1918 |
| 1,437,462 | Belvel | Dec. 5, 1922 |
| 1,810,782 | Morris | June 16, 1931 |